(12) United States Patent
Sung et al.

(10) Patent No.: US 12,352,702 B2
(45) Date of Patent: Jul. 8, 2025

(54) METHOD AND SYSTEM FOR EVALUATING LIFESPAN OF ORGANIC LIGHT EMITTING DISPLAY PANEL

(71) Applicant: SAMSUNG DISPLAY CO., LTD., Yongin-si (KR)

(72) Inventors: Si Jin Sung, Yongin-si (KR); Jae Hong Kim, Yongin-si (KR); Hyo Min Kim, Yongin-si (KR); Ill Soo Park, Yongin-si (KR); Jong Seok Han, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 254 days.

(21) Appl. No.: 17/860,714

(22) Filed: Jul. 8, 2022

(65) Prior Publication Data

US 2023/0116648 A1    Apr. 13, 2023

(30) Foreign Application Priority Data

Oct. 13, 2021   (KR) .......................... 10-2021-0136097

(51) Int. Cl.
  *G09G 3/32*    (2016.01)
  *G01N 21/95*   (2006.01)
  *G09G 3/3225*  (2016.01)

(52) U.S. Cl.
  CPC .......... *G01N 21/95* (2013.01); *G09G 3/3225* (2013.01); *G09G 2320/048* (2013.01); *G09G 2360/147* (2013.01); *G09G 2360/16* (2013.01)

(58) Field of Classification Search
  CPC ................. G01N 21/95; G09G 3/3225; G09G 2320/048; G09G 2360/147;

(Continued)

(56) References Cited

U.S. PATENT DOCUMENTS

2014/0055500 A1    2/2014   Lai
2016/0140905 A1*   5/2016   Yoo ..................... G09G 3/3233
                                                          345/82

(Continued)

FOREIGN PATENT DOCUMENTS

EP        2159783 A1       3/2010
KR    1020170080738 A      7/2017

OTHER PUBLICATIONS

Kam et al., "RGB Pixel Aging in OLED Displays", SID Symposium Digest of Technical Papers, vol. 54, issue 1, 2023, pp. 1685-1688.

(Continued)

*Primary Examiner* — Towfiq Elahi
(74) *Attorney, Agent, or Firm* — CANTOR COLBURN LLP

(57) ABSTRACT

A method for evaluating a lifespan of an organic light emitting display panel includes: aging an organic light emitting display panel, including first light emitting elements for emitting a first color, second light emitting elements for emitting a second color, and third light emitting elements for emitting a third color, during a preset aging period by displaying the first color in a first pattern area of the organic light emitting display panel and displaying a fourth color in a second pattern area of the organic light emitting display panel; measuring luminances of the first pattern area and the second pattern area by displaying the first color in the first pattern area and the second pattern area during a measurement period; and calculating a lifespan of the first light emitting elements based on the measured luminance of the first pattern area and the measured luminance of the second pattern area.

10 Claims, 12 Drawing Sheets

(58) Field of Classification Search
CPC ....... G09G 2360/16; G09G 2320/0242; G09G 2320/043; G09G 2320/0693; G09G 3/3208; G09G 3/006; H10K 59/35; H10K 71/70; H10K 71/831
See application file for complete search history.

(56) References Cited

U.S. PATENT DOCUMENTS

| | | | |
|---|---|---|---|
| 2016/0366747 A1 | 12/2016 | Han et al. | |
| 2019/0198579 A1* | 6/2019 | Park | H10K 50/865 |
| 2020/0388207 A1* | 12/2020 | Jo | G09G 3/2007 |
| 2022/0093059 A1* | 3/2022 | Yang | G09G 5/10 |

OTHER PUBLICATIONS

Kam Kevin et al., "57-3: Characterizing Image Retention for HDR OLED Displays", SID Symposium Digest of Technical Papers, vol. 51, No. 1, pp. 850-853.

Kim et al., "An Evaluation Methodology for Display Retention Measurement," SID Symposium Digest of Technical Papers, vol. 49, No. 1, pp. 80-83.

* cited by examiner

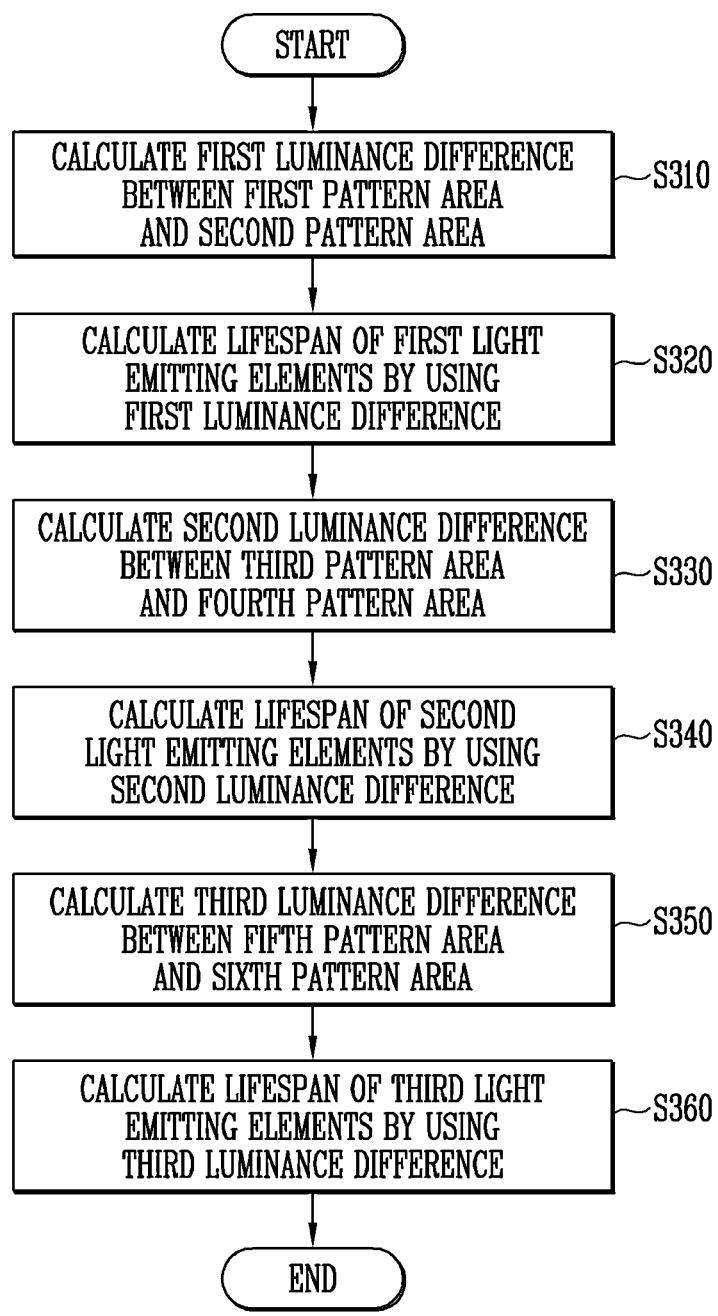

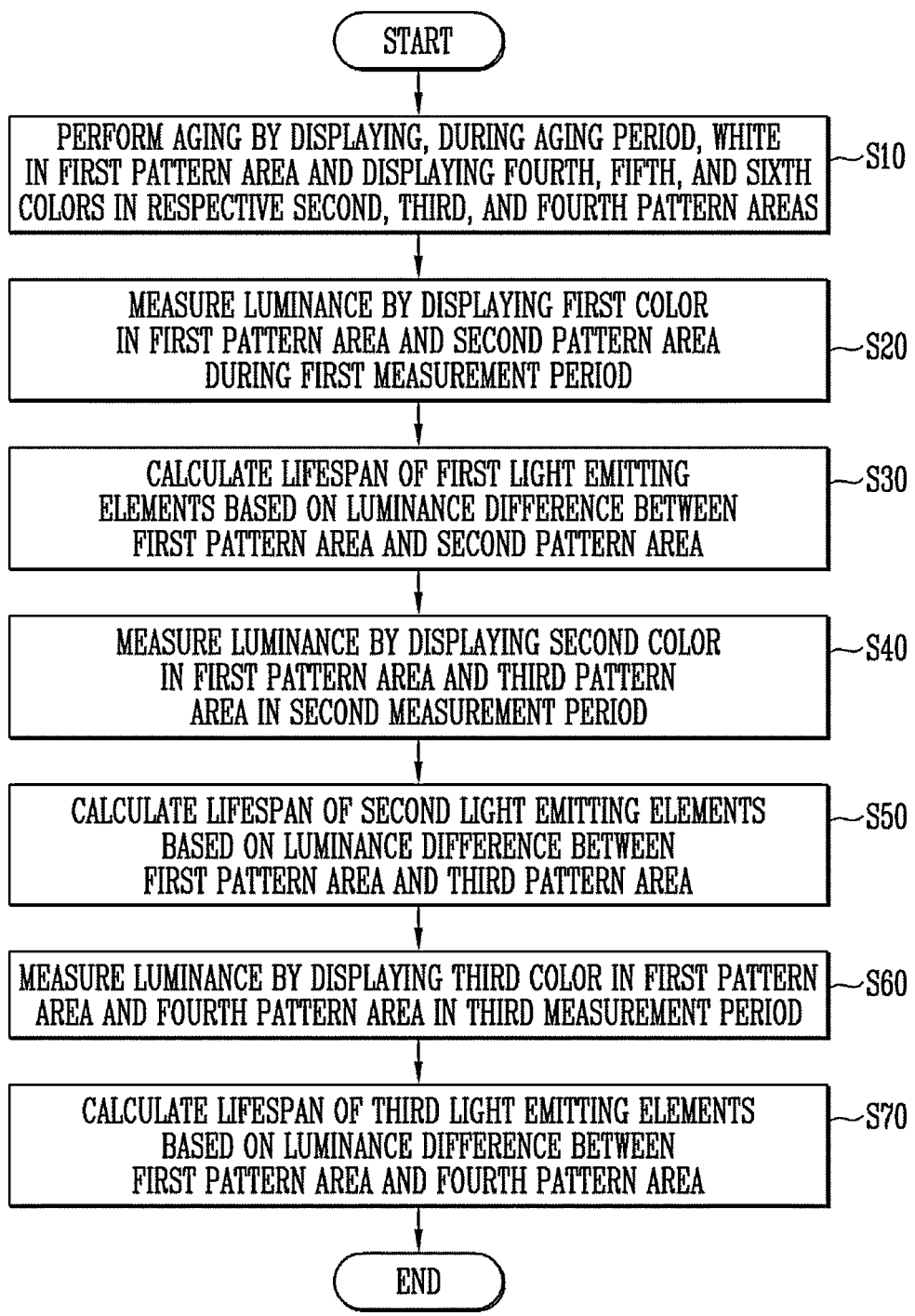

METHOD AND SYSTEM FOR EVALUATING LIFESPAN OF ORGANIC LIGHT EMITTING DISPLAY PANEL

This application claims priority to Korean Patent Application No. 10-2021-0136097, filed on Oct. 13, 2021, and all the benefits accruing therefrom under 35 U.S.C. § 119, the content of which in its entirety is herein incorporated by reference.

BACKGROUND

1. Field

The present invention relates to a method and a system for evaluating a lifespan of an organic light emitting display panel.

2. Description of the Related Art

An organic light emitting display panel included in a display device displays an image by using an organic light emitting element (or an organic light emitting diode) that generates light by recombination of electrons and holes. Such an organic light emitting display panel has an advantage of having a fast response time and being driven with low power consumption. In addition, the organic light emitting display panel may be reduced in weight and thickness and may also be applied to a flexible display device.

The organic light emitting display panel may have a limited lifespan and deteriorates so that luminescence efficiency decreases over time. For example, the lifespan of the organic light emitting elements may gradually decrease with use time, and the driving voltage applied to the organic light emitting elements may change (for example, gradually increase) for the same image according to use time. The lifespan of the organic light emitting display panel or the organic light emitting element may be the most important factor for commercialization of the device.

SUMMARY

An aspect of the present invention is to provide a method for evaluating a lifespan of an organic light emitting display ("OLED") panel, which displays pattern areas in different colors during an aging period and calculates the lifespan of the light emitting elements by comparing the luminance between the pattern areas displaying the same color during a measurement period.

Another aspect of the present invention is to provide a system for evaluating a lifespan of an OLED panel, which is driven by the method for evaluating the lifespan of the OLED panel.

However, the aspects of the present invention are not limited to the above-described aspects, and may be variously expanded without departing from the spirit and scope of the present invention.

In order to achieve one aspect of the present invention, a method for evaluating a lifespan of an organic light emitting display panel according to embodiments of the present invention includes: aging an organic light emitting display panel, including first light emitting elements for emitting a first color, second light emitting elements for emitting a second color, and third light emitting elements for emitting a third color, during a preset aging period by displaying the first color in a first pattern area of the organic light emitting display panel and displaying a fourth color in a second pattern area of the organic light emitting display panel; measuring luminances of the first pattern area and the second pattern area by displaying the first color in the first pattern area and the second pattern area during a measurement period; and calculating a lifespan of the first light emitting elements based on the measured luminance of the first pattern area and the measured luminance of the second pattern area.

According to an embodiment, the second light emitting elements and the third light emitting elements may emit light so as to display the fourth color in the second pattern area during the aging period.

According to an embodiment, the fourth color may be a complementary color of the first color in an RGB additive color mixing model. According to an embodiment, the calculating of the lifespan of the first light emitting elements may include: calculating a luminance difference between the first pattern area and the second pattern area; and calculating the lifespan of the first light emitting elements by using the luminance difference.

According to an embodiment, the method for evaluating the lifespan may further include, during the aging period, displaying the second color in a third pattern area of the organic light emitting display panel, displaying a fifth color in a fourth pattern area of the organic light emitting display panel, displaying the third color in a fifth pattern area of the organic light emitting display panel, and displaying a sixth color in a sixth pattern area of the organic light emitting display panel.

According to an embodiment, the first light emitting elements and the third light emitting elements may emit light in the fourth pattern area, and the first light emitting elements and the second light emitting elements may emit light in the sixth pattern area during the aging period.

According to an embodiment, the first to sixth pattern areas may simultaneously emit light.

According to an embodiment, the fifth color may be a complementary color of the second color in an RGB additive color mixing model, and the sixth color may be a complementary color of the third color in the RGB additive color mixing model.

According to an embodiment, the method for evaluating the lifespan may further include: measuring luminances of the third pattern area and the fourth pattern area by displaying the second color in the third pattern area and the fourth pattern area during the measurement period; and measuring luminances of the fifth pattern area and the sixth pattern area by displaying the third color in the fifth pattern area and the sixth pattern area during the measurement period.

According to an embodiment, during the measurement period, the first light emitting elements may emit light in the first and second pattern areas, the second light emitting elements may emit light in the third and fourth pattern areas, and the third light emitting elements may emit light in the fifth and sixth pattern areas.

According to an embodiment, the method for evaluating the lifespan may further include: calculating a lifespan of the second light emitting elements by using a difference between the measured luminance of the third pattern area and the measured luminance of the fourth pattern area; and calculating a lifespan of the third light emitting elements by using a difference between the measured luminance of the fifth pattern area and the measured luminance of the sixth pattern area.

According to an embodiment, the first, second, and third colors may be red, green, and blue, respectively, and the fourth, fifth, and sixth colors may be cyan, magenta, and yellow, respectively.

In order to achieve one aspect of the present invention, a method for evaluating a lifespan of an organic light emitting display panel according to embodiments of the present invention includes: aging an organic light emitting display panel, including first light emitting elements for emitting a first color, second light emitting elements for emitting a second color, and third light emitting elements for emitting a third color, during a preset aging period by displaying white color in a first pattern area of the organic light emitting display panel and displaying fourth, fifth, and sixth colors in second, third, and fourth pattern areas of the organic light emitting display panel, respectively; measuring luminances of the first pattern area and the second pattern area by displaying the first color in the first pattern area and the second pattern area during a first measurement period; and calculating a lifespan of the first light emitting elements based on a luminance difference between the first pattern area and the second pattern area.

According to an embodiment, during the aging period, the second light emitting elements and the third light emitting elements may emit light in the second pattern area, the first light emitting elements and the third light emitting elements may emit light in the third pattern area, and the first light emitting elements and the second light emitting elements may emit light in the fourth pattern area.

According to an embodiment, the fourth, fifth, and sixth colors may be complementary colors of the first, second, and third colors, respectively, in an RGB additive color mixing model.

According to an embodiment, the method may further include: measuring luminances of the first pattern area and the third pattern area by displaying the second color in the first pattern area and the third pattern area in a second measurement period; calculating a lifespan of the second light emitting elements based on a difference between the measured luminance of the first pattern area and the measured luminance of the third pattern area during the second measurement period; measuring luminances of the first pattern area and the fourth pattern area by displaying the third color in the first pattern area and the fourth pattern area in a third measurement period; and calculating a lifespan of the third light emitting elements based on a difference between the measured luminance of the first pattern area and the measured luminance of the fourth pattern area.

According to an embodiment, the first, second, and third colors may be red, green, and blue, respectively, and the fourth, fifth, and sixth colors may be cyan, magenta, and yellow, respectively.

In order to achieve one aspect of the present invention, a system for evaluating a lifespan of an organic light emitting display panel according to embodiments of the present invention includes: an organic light emitting display panel including first light emitting elements for emitting a first color, second light emitting elements for emitting a second color, and third light emitting elements for emitting a third color; a panel driving device which controls light emission of the organic light emitting display panel during an aging period and a measurement period; a luminance measuring device which measures luminance of the first and second pattern areas of the organic light emitting display panel during the measurement period; and a lifespan calculating device which calculates a lifespan of the first light emitting elements based on a difference between the measured luminance of the first pattern area and the measured luminance of the second pattern area, where, in the aging period, the first light emitting elements emit light in the first pattern area, and the second and third light emitting elements emit light in the second pattern area, and in the measurement period, the first light emitting elements emit light in the first and second pattern areas.

According to an embodiment, during the aging period, the second light emitting elements may emit light in a third pattern area of the organic light emitting display panel, the first and third light emitting elements may emit light in a fourth pattern area of the organic light emitting display panel, the third light emitting elements may emit light in a fifth pattern area of the organic light emitting display panel, and the first and second light emitting elements may emit light in a sixth pattern area of the organic light emitting display panel. In the measurement period, the second light emitting elements may emit light in the third and fourth pattern areas, and the third light emitting elements may emit light in the fifth and sixth pattern areas. The luminance measuring device may measure luminance of the third to sixth pattern areas during the measurement period.

According to an embodiment, the lifespan calculating device may calculate a lifespan of the second light emitting elements based on a difference between the measured luminance of the third pattern area and the measured luminance of the fourth pattern area, and may calculate a lifespan of the third light emitting elements based on a difference between the measured luminance of the fifth pattern area and the measured luminance of the sixth pattern area.

BRIEF DESCRIPTION OF THE DRAWINGS

FIG. 7 is a flowchart illustrating an example of a step of calculating the lifespan of light emitting elements in the method for evaluating the lifespan of the OLED panel in FIG. 1.

FIG. 9 is a flowchart illustrating a method for evaluating a lifespan of an OLED panel according to embodiments of the present invention.

DETAILED DESCRIPTION

Figure 1:
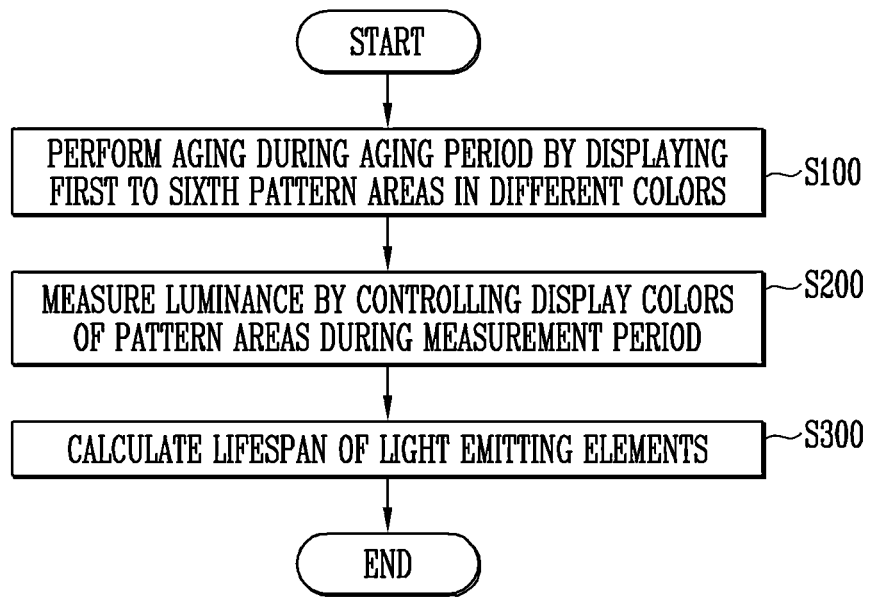
FIG. 1 is a flowchart illustrating a method for evaluating a lifespan of an organic light emitting display (OLED) panel according to embodiments of the present invention.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, preferred embodiments of the present invention will be described in more detail with reference to the accompanying drawings. The same reference numerals are used to refer to the same elements in the drawings, and redundant descriptions thereof are omitted.

Figure 2:
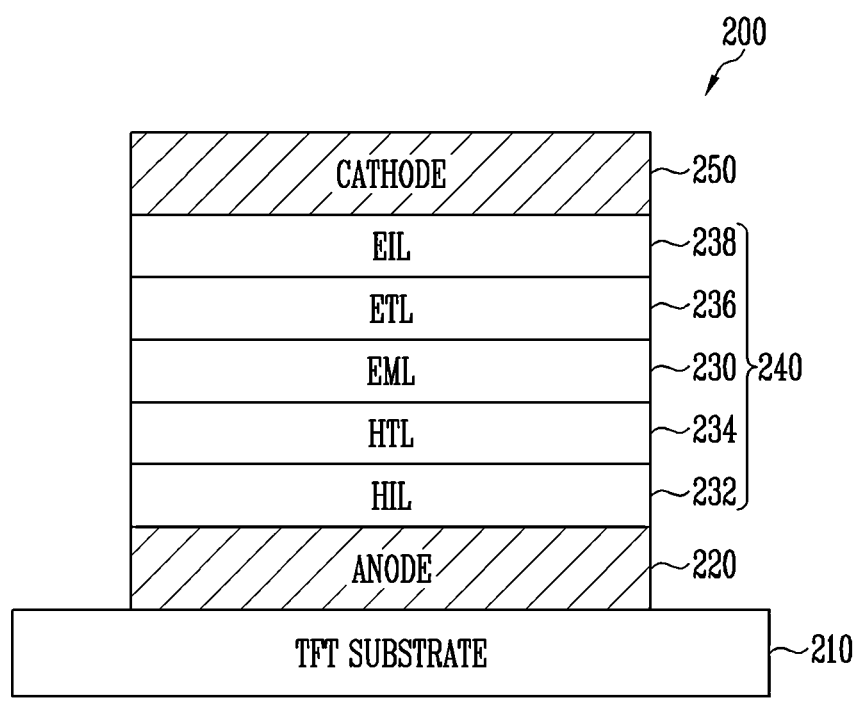
FIG. 2 is a diagram illustrating an example of an OLED panel.
Figure 3:
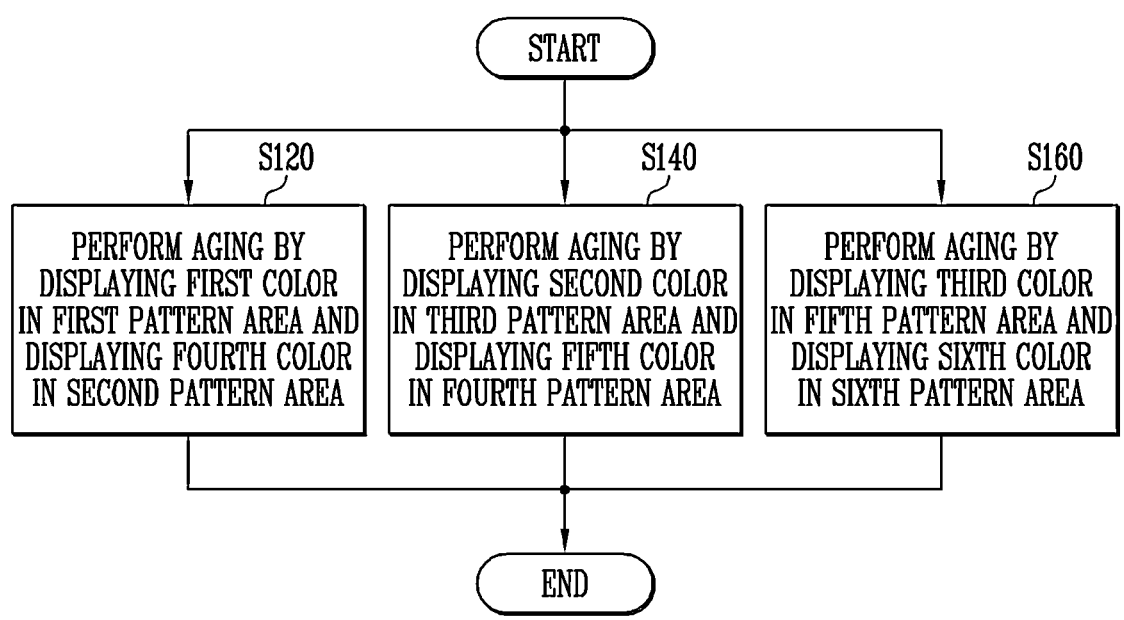
FIG. 3 is a flowchart illustrating an example of an aging step in the method for evaluating the lifespan of the OLED panel in FIG. 1.
Figure 4:
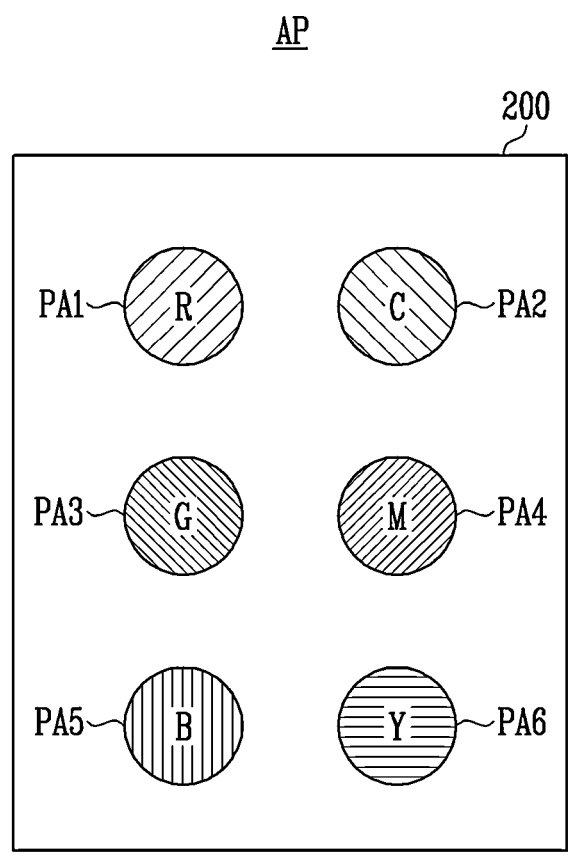
FIG. 4 is a diagram illustrating an example of pattern areas displayed on the OLED panel during an aging period.
Figure 5:
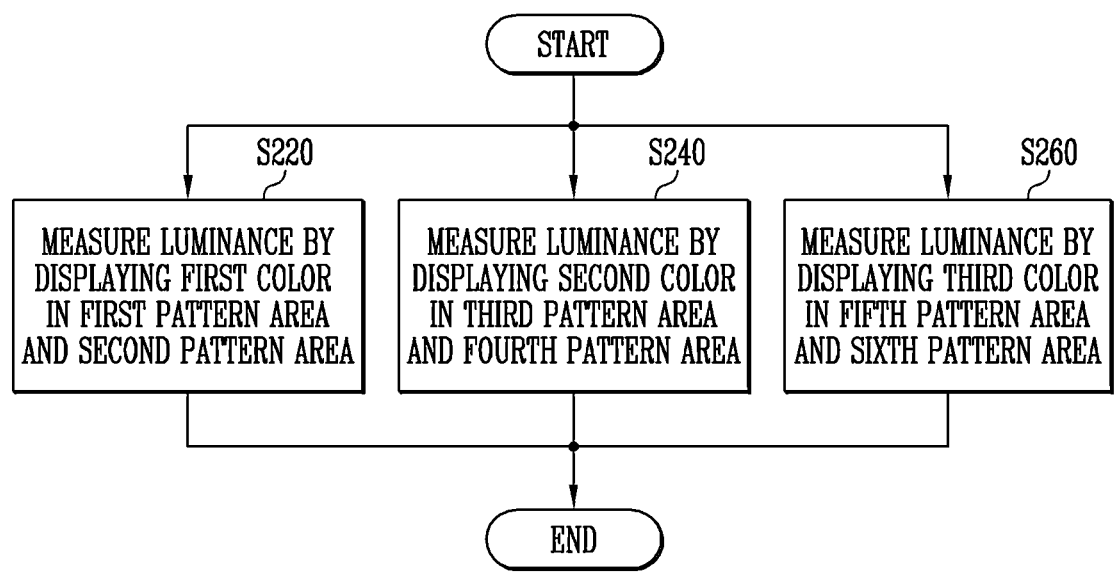
FIG. 5 is a flowchart illustrating an example of a step of measuring luminance in the method for evaluating the lifespan of the OLED panel in FIG. 1.
Figure 6:
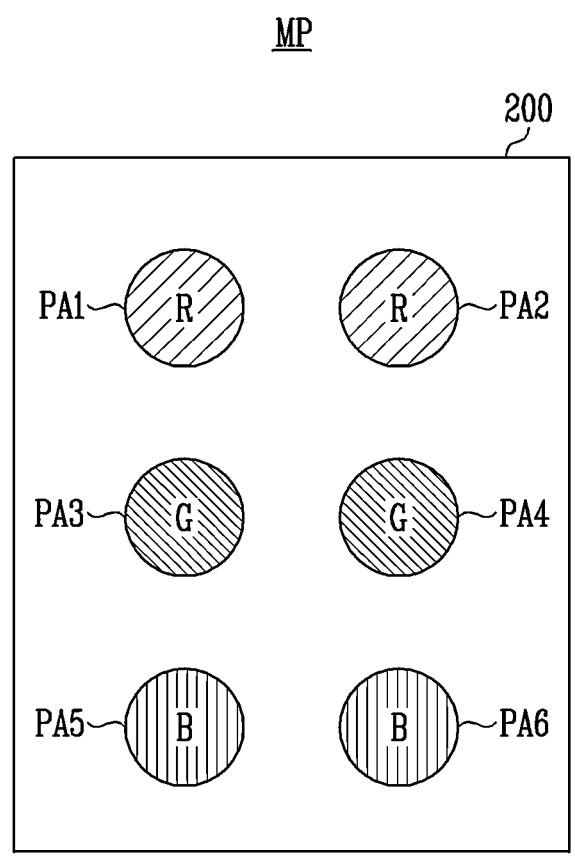
FIG. 6 is a diagram illustrating an example of pattern areas displayed on the OLED panel during a measurement period.

FIG. 1 is a flowchart illustrating a method for evaluating a lifespan of an organic light emitting display (OLED) panel according to embodiments of the present invention, and FIG. 2 is a diagram illustrating an example of an OLED panel. FIG. 3 is a flowchart illustrating an example of an aging step in the method for evaluating the lifespan of the OLED panel in FIG. 1, and FIG. 4 is a diagram illustrating an example of pattern areas displayed on the OLED panel during an aging period. FIG. 5 is a flowchart illustrating an example of a step of measuring luminance in the method for evaluating the lifespan of the OLED panel in FIG. 1, and FIG. 6 is a diagram illustrating an example of pattern areas displayed on the OLED panel during a measurement period. FIG. 7 is a flowchart illustrating an example of a step of calculating the lifespan of light emitting elements in the method for evaluating the lifespan of the OLED panel in FIG. 1.

Referring to FIGS. 1, 2, 3, 4, 5, 6, and 7, a method for evaluating a lifespan of an OLED panel 200 may include: aging pattern areas PA1 to PA6 of the OLED panel 200 for a preset aging period AP (S100), measuring luminance by controlling display colors of the pattern areas PA1 to PA6 during a measurement period MP (S200), and calculating the lifespan of light emitting elements based on the luminance difference between selected pattern areas (S300).

In an embodiment, the OLED panel 200 may include first light emitting elements for emitting a first color, second light emitting elements for emitting a second color, and third light emitting elements for emitting a third color. For example, the first color, the second color, and the third color may be red, green, and blue, respectively.

Hereinafter, it is assumed that the first color is red (R), the second color is green (G), and the third color is blue (B).

As used herein, the lifespan of the light emitting elements may be a representative lifespan of the same kind of the light emitting elements included in the OLED panel 200. For example, the lifespan of the first light emitting elements may be a representative lifespan of the red light emitting element of the corresponding OLED panel 200, the lifespan of the second light emitting elements may be a representative lifespan of the green light emitting element of the corresponding OLED panel 200, and the lifespan of the third light emitting elements may be a representative lifespan of the blue light emitting element of the OLED panel 200.

In an embodiment, as illustrated in FIG. 2, the OLED panel 200 may include a substrate 210 on which a thin film transistor ("TFT") is disposed, an anode 220 disposed on the substrate 210, an organic layer 240 disposed on the anode 220, and a cathode 250 disposed on the organic layer 240. For example, an organic light emitting element may include the anode 220, the organic layer 240, and the cathode 250. In the OLED panel 200, holes and electrons from the anode 220 and the cathode 250 may be injected into the organic layer 240, and light may be emitted when exciton formed by the recombination of the injected holes and electrons falls from an excited state to a ground state.

The organic layer 240 may include an emission layer ("EML") 230. According to an embodiment, the organic layer 240 may include at least one of a hole injection layer ("HIL") 232, a hole transporting layer ("HTL") 234, an electron transporting layer ("ETL") 236, and an electron injection layer ("EIL") 238. The hole injection layer 232 may allow holes to be injected into the emission layer 230. The hole transporting layer 234 is a layer having excellent hole transporting property, and may be provided to increase the chance of recombination of holes and electrons by suppressing the movement of electrons that are not combined in the emission layer 230. The electron transporting layer 236 may be provided to smoothly transport electrons to the emission layer 230. The electron injection layer 238 may allow electrons to be injected toward the electron transporting layer 236 or the emission layer 230.

In an embodiment, the organic layer 240 may further include a hole blocking layer (not shown) for suppressing the movement of holes that are not combined in the emission layer 230.

In an embodiment, the anode 220 may include a reflective film capable of reflecting light, and a transparent conductive film disposed above or below the reflective film. At least one of the transparent conductive film and the reflective film may be connected to a lower thin film transistor.

The reflective film may include a material capable of reflecting light. For example, the reflective film may include at least one selected from aluminum (Al), silver (Ag), chromium (Cr), molybdenum (Mo), platinum (Pt), nickel (Ni), and any alloy thereof.

The transparent conductive film may include a transparent conductive oxide. For example, the transparent conductive film may include at least one transparent conductive oxide selected from indium tin oxide ("ITO"), indium zinc oxide ("IZO"), aluminum zinc oxide ("AZO"), gallium doped zinc oxide ("GZO"), zinc tin oxide ("ZTO"), gallium tin oxide ("GTO"), and fluorine doped tin oxide ("FTO").

In an embodiment, the cathode 250 may be a transflective film. For example, the cathode 250 may be a thin metal layer having a thickness sufficient to transmit light therethrough. The cathode 250 may transmit a part of the light emitted from the emission layer 230 and reflect the remaining part of the light emitted from the emission layer 230.

In an embodiment, the cathode 250 may include a material having a lower work function than that of the transparent conductive layer. For example, the cathode 250 may include at least one selected from molybdenum (Mo), tungsten (W), silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), and any alloy thereof.

In an embodiment, a part of the light emitted from the emission layer 230 may not pass through the cathode 250 and be reflected from the cathode 250, and the light reflected from the cathode 250 may be reflected back by a reflective film (not illustrated). That is, the light emitted from the emission layer 230 may resonate between the reflective film and the cathode 250. Light extraction efficiency of the organic light emitting element may be improved by resonance of light.

The organic light emitting elements (pixels) included in the OLED panel 200 may have different light extraction efficiencies according to the emitted color and may have different lifespans. That is, since organic materials deteriorate due to external/internal influences on the organic light emitting elements, the luminance gradually decreases even if the same current is supplied according to the use of the OLED panel 200. Therefore, in order to evaluate the performance of the OLED panel 200, the lifespan evaluation of the light emitting elements is desirable.

During the lifespan measurement (or the lifespan evaluation), the organic light emitting elements may deteriorate, and characteristics of the thin film transistors of the substrate may also change (or deteriorate). The change in the characteristics of the thin film transistors may act as noise in measuring the lifespan of the organic light emitting element (hereinafter, referred to as "the light emitting element"). Therefore, the influence of the characteristic change of the thin film transistors in measuring the lifespan of the light emitting element is desirable to be minimized.

A conventional RGB monochromatic lifespan evaluation method measures a change in black luminance and a change in white luminance. For example, a partial area (e.g., a white area) of the OLED panel 200 emits full-white light, another area (e.g., a black area) is displayed in black, and aging is performed thereon. After the aging, the OLED panel 200 may be displayed in red, and the lifespan of the red light emitting element (e.g., red lifespan) may be calculated based on the luminance difference between the white area and the black area. In this manner, the lifespan of the green light emitting element (e.g., green lifespan) and the lifespan of the blue light emitting element (e.g., blue lifespan) are also calculated.

In other words, according to the conventional lifespan evaluation method, the lifespan of the light emitting elements may be measured by using the change in the luminance of the white area with respect to the change in the luminance of the black area. For example, the lifespan of the light emitting elements may be defined based on a time until the luminance reaches about 93 percentages (%) of the initial maximum luminance. However, this is an example, and a luminance reduction value for defining the lifespan is not limited thereto. For example, the lifespan of the light emitting element may be defined based on the time until the luminance reaches about 95% of the initial maximum luminance or the time until the luminance reaches about 50% of the initial maximum luminance in other embodiments.

However, since the initial deterioration of the thin film transistors in the black area and the white area proceeds at different rates due to the difference in the amount of current in the initial panel driving or the like, the initial deterioration of the thin film transistors acts as noise in the initial lifespan measurement. In general, the luminance change under the influence of the thin film transistor is caused by the thin film transistor stress. As the amount of current for initial driving increases, the initial characteristic change of the thin film transistors appears faster. Thus, a relative decrease in the luminance of the white area appears faster than a relative decrease in the luminance of the black area.

Therefore, a phenomenon in which the luminance rapidly drops at the initial stage of the lifespan evaluation may occur. In addition, since the amount of change in white luminance is stabilized relatively faster than that of black luminance, the deviation between black luminance and white luminance is inevitably large at the initial stage of the lifespan evaluation. This is due to the initial stress deviation of the thin film transistors and is treated as garbage data. Equivalent impedance of an equivalent circuit viewed from each pixel may be changed by the initial stress deviation of the thin film transistors, and accordingly, the voltage level transmitted to each of the pixels may be different and the luminance may be unstable.

Such garbage data is desirable to be removed in the monochromatic lifespan evaluation and lifespan modeling of the light emitting element, and the initial evaluation time of about 10 hours or more (for example, about 50 hours) for generating garbage data is desirable to be excluded. Therefore, there are disadvantages in that the lifespan evaluation time of the light emitting element is long and it is difficult to obtain reliable lifespan data.

For improving the problem of the monochromatic lifespan evaluation based on black-white aging, the method for evaluating the lifespan of the OLED panel may be performed as follows.

In an embodiment, different colors may be displayed on first to sixth pattern areas PA1 to PA6 of the OLED panel 200 during the aging period AP, and aging is performed thereon (S100). The length of the aging period AP may be variably set according to operating conditions. Each of the first to sixth pattern areas PA1 to PA6 may be about 5-15% of the total area of the OLED panel 200.

In an embodiment, as illustrated in FIGS. 3 and 4, the aging may be performed by displaying the first color R in the first pattern area PA1 and displaying the fourth color C in the second pattern area PA2 during the aging period AP (S120). For example, only the first light emitting elements for emitting red light may emit light, among the first to third light emitting elements in the first pattern area PA1, and only the second light emitting elements for emitting green light and the third light emitting elements for emitting blue light may emit light, among the first to third light emitting elements in the second pattern area PA2. Therefore, the fourth color C may be cyan in which blue and green are additively mixed in the RGB additive color mixing model, and may be a complementary color of the first color R.

In other words, light emitting elements other than the first light emitting elements may emit light in the second pattern area PA2. For example, the first pattern area PA1 and the second pattern area PA2 are areas for measuring the lifespan (i.e., red lifespan) of the first light emitting elements. During the aging period AP, the first light emitting elements may mainly deteriorate in the first pattern area PA1, and the second and third light emitting elements may mainly deteriorate in the second pattern area PA2.

Similarly, as illustrated in FIGS. 3 and 4, the aging may be performed by displaying the second color G in the third pattern area PA3 and displaying the fifth color M in the fourth pattern area PA4 during the aging period AP (S140). For example, only the second light emitting elements may emit light among the first to third light emitting elements in the third pattern area PA3, and only the first light emitting elements and the third light emitting elements may emit light among the first to third light emitting elements in the fourth pattern area PA4. The fifth color M may be magenta in which red and blue are additively mixed in the RGB additive color mixing model, and may be a complementary color of the second color G.

For example, the third pattern area PA3 and the fourth pattern area PA4 may be areas for measuring the lifespan (i.e., green lifespan) of the second light emitting elements.

In addition, as illustrated in FIGS. 3 and 4, the aging may be performed by displaying the third color B in the fifth pattern area PA5 and displaying the sixth color Y in the sixth pattern area PA6 during the aging period AP (S160). For example, only the third light emitting elements may emit light among the first to third light emitting elements in the fifth pattern area PA5, and only the first light emitting elements and the second light emitting elements may emit light among the first to third light emitting elements in the sixth pattern area PA6. The sixth color Y may be yellow in which red and green are additively mixed in the RGB additive color mixing model, and may be a complementary color of the third color B.

For example, the fifth pattern area PA5 and the sixth pattern area PA6 may be areas for measuring the lifespan (i.e., blue lifespan) of the third light emitting elements.

In an embodiment, during the aging period AP, a portion of the OLED panel 200 excluding the first to sixth pattern areas PA1 to PA6 may display black.

In the measurement period MP, the luminance may be measured by controlling the display colors of the first to sixth pattern areas PA1 to PA6 (S200). The measurement period MP may be a short period for measuring the luminance of the first to sixth pattern areas PA1 to PA6. For example, the measurement period MP may amount to several frames, and the luminance of each of the first to sixth pattern areas PA1 to PA6 may be measured simultaneously or sequentially during the measurement period MP. In addition, the first to sixth pattern areas PA1 to PA6 may simultaneously emit light during the measurement period MP.

In an embodiment, the luminance of the first to sixth pattern areas PA1 to PA6 may be measured from an optical apparatus for measuring luminance and/or color coordinates. For example, the luminance of the first to sixth pattern areas PA1 to PA6 may be measured by using a luminance colorimeter, a spectrophotometer, or the like. Alternatively, the luminance of the first to sixth pattern areas PA1 to PA6 may be measured by sensing a current/voltage from an optical apparatus including a photodiode (e.g., a CCD camera, etc.).

In an embodiment, as illustrated in FIGS. 5 and 6, the luminances may be measured by displaying the first color R in the first pattern area PA1 and the second pattern area PA2 during the measurement period MP, respectively. That is, data for measuring the lifespan of the first light emitting pixels may be extracted through aging and luminance measurement of the first pattern area PA1 and the second pattern area PA2.

In addition, luminances may be measured by displaying the second color G in the third pattern area PA3 and the fourth pattern area PA4 during the measurement period MP, respectively. That is, the luminance of the second color G in the third pattern area PA3 may be measured during the measurement period MP, and the luminance of the second color G in the fourth pattern area PA4 may be measured during the measurement period MP, separately. Data for measuring the lifespan of the second light emitting pixels may be extracted through aging and luminance measurement of the third pattern area PA3 and the fourth pattern area PA4.

In addition, the luminances may be measured by displaying the third color B in the fifth pattern area PA5 and the sixth pattern area PA6 during the measurement period MP, respectively. Data for measuring the lifespan of the third light emitting pixels may be extracted through aging and luminance measurement of the fifth pattern area PA5 and the sixth pattern area PA6.

In other words, during the measurement period MP, one of the first color R, the second color G, and the third color B is displayed in each of the first to sixth pattern areas PA1 to PA6, and each luminance may be measured.

Thereafter, the lifespan of the first to third light emitting elements may be calculated (S300).

The lifespan of the first light emitting elements may be calculated based on the luminance of the first pattern area PA1 and the luminance of the second pattern area PA2 measured during the measurement period MP. In an embodiment, a first luminance difference that is a luminance difference between the first pattern area PA1 and the second pattern area PA2 may be calculated (S310), and the lifespan of the first light emitting elements may be calculated by using the first luminance difference (S320). For example, the first luminance difference may be calculated from a subtraction value between a luminance ratio of the first pattern area PA1 and a luminance ratio of the second pattern area PA2. The luminance ratio may be defined as a ratio of a currently measured luminance to an initial luminance in the corresponding pattern area.

According to an embodiment, the first luminance difference may correspond to a result of subtracting the above subtraction value from a reference value (1 or 100%) of the luminance ratio. For example, when the luminance ratio of the first pattern area PA1 is 0.99 and the luminance ratio of the second pattern area PA2 is 0.98 at the first time point, the difference (i.e., subtraction value) between the two values may be 0.01. In this case, the first luminance difference may be 0.99, which is obtained by subtracting 0.01 from 1.

On the other hand, the lifespan of the first light emitting elements may be determined by various known calculation methods. For example, a lifespan class corresponding to the first luminance difference may be obtained from a lookup table in which a relationship between lifespan classes and luminance differences is stored.

Alternatively, the lifespan of the light emitting elements may be exponentially reduced, and the lifespan of the light emitting elements may be defined by a certain exponential function. Therefore, the lifespan of the first light emitting elements may be determined by applying the first luminance difference to the set exponential function in this embodiment.

However, this is an example, and the method for calculating the monochromatic lifespan is not limited thereto.

In an embodiment, a second luminance difference that is a luminance difference between the third pattern area PA3 and the fourth pattern area PA4 may be calculated (S330), and the lifespan of the second light emitting elements may be calculated by using the second luminance difference (S340). For example, the second luminance difference may be calculated based on a subtraction value between a luminance ratio of the third pattern area PA3 and a luminance ratio of the fourth pattern area PA4. The luminance ratio may be defined as a ratio of a currently measured luminance to an initial luminance in the corresponding pattern area.

In addition, a third luminance difference that is a luminance difference between the fifth pattern area PA5 and the sixth pattern area PA6 may be calculated (S350), and the lifespan of the third light emitting elements may be calculated by using the third luminance difference (S360). For example, the third luminance difference may be calculated based on a subtraction value between a luminance ratio of the fifth pattern area PA5 and a luminance ratio of the sixth pattern area PA6. Even though FIG. 7 shows an embodiment that the steps S310 to S360 are performed sequentially, the invention is not limited thereto. In another embodiment, steps S310, S330, and S350 may be performed at the same time, step S330 or S350 may be performed before step S310, or step S350 may be performed before step S330.

As described above, the RGB monochromatic lifespan of the first to third light emitting elements may be evaluated based on the image pattern control and the measured luminance for the first to sixth pattern areas PA1 to PA6.

The process of calculating the aging period AP, the measurement period MP, and the lifespan described with reference to FIGS. 3 to 7 is repeated until the monochromatic luminance drops to a preset standard (e.g., about 93% of the initial luminance), and the time until the end of the repetition may be determined as the evaluation time.

Figure 8A:
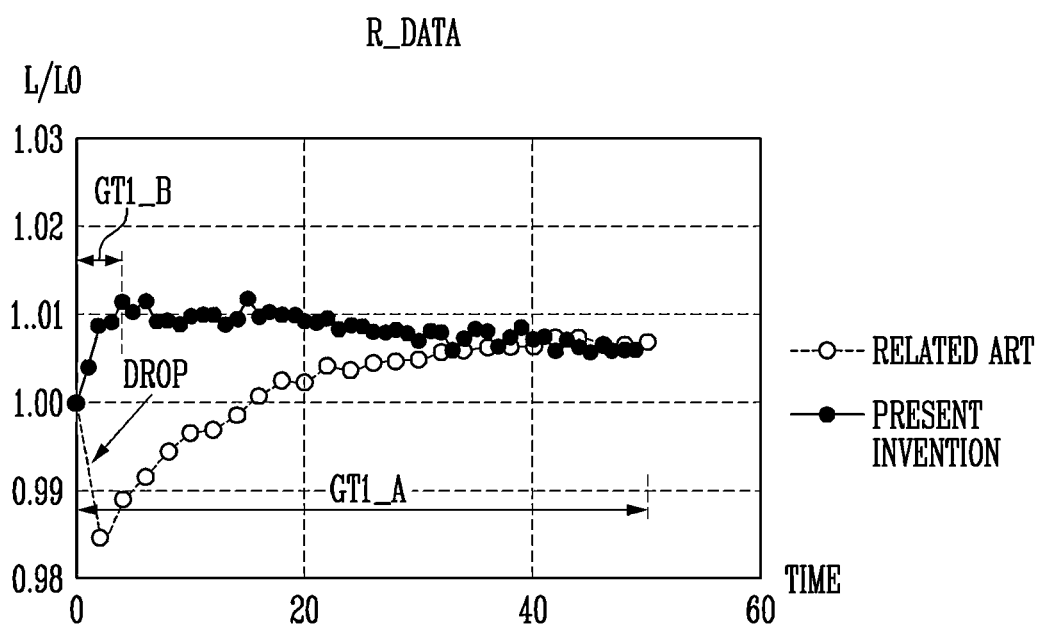
FIGS. 8A to 8C are diagrams illustrating examples of data output for calculating the lifespan of the light emitting elements.
Figure 8B:
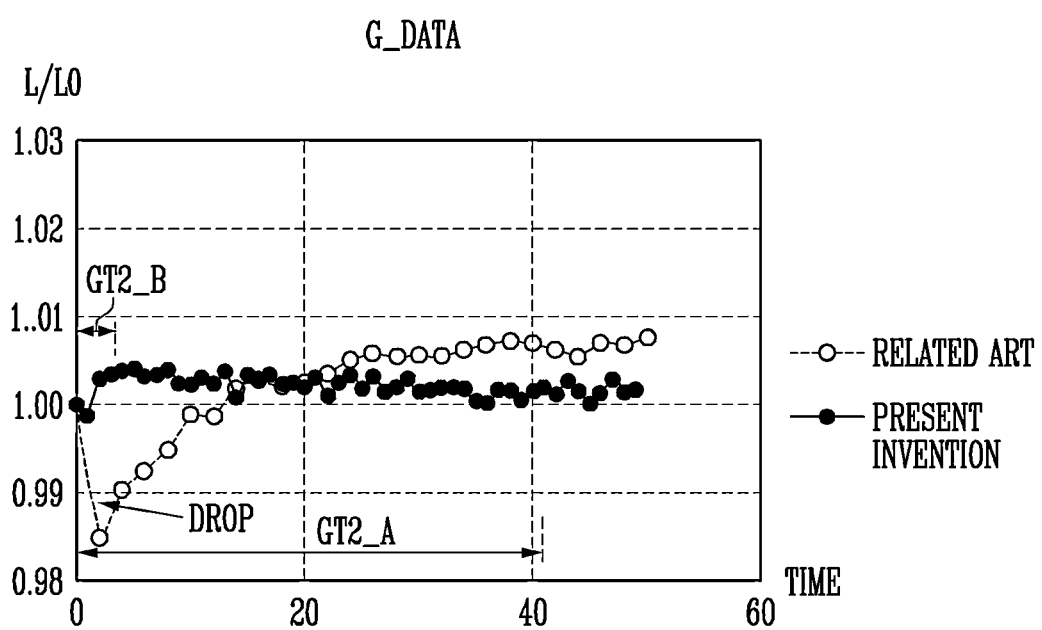
Figure 8C:
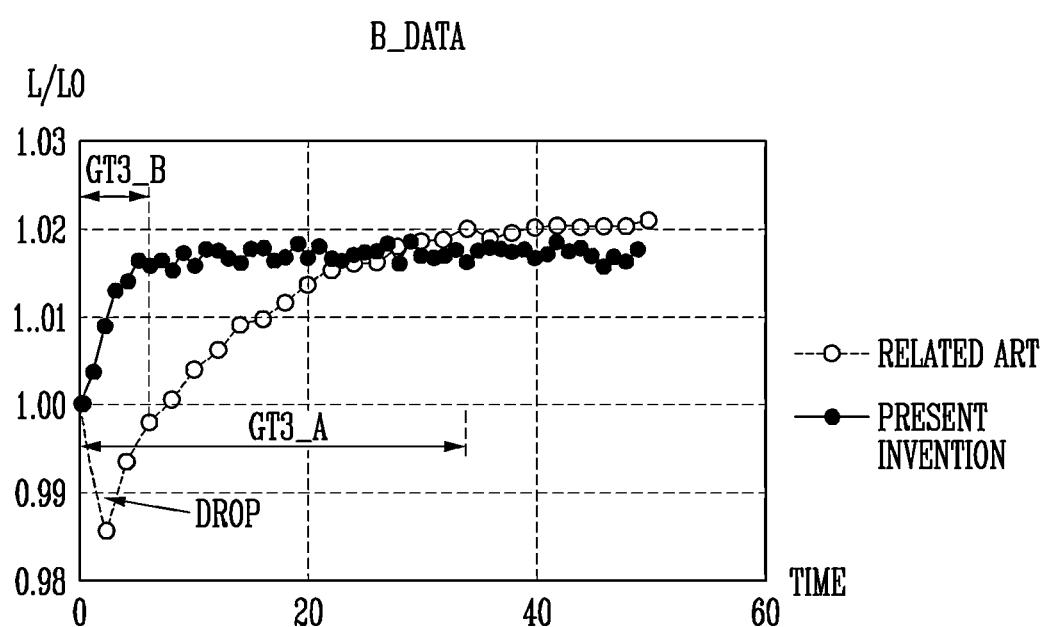

FIGS. 8A to 8C are diagrams illustrating examples of data output for calculating the lifespan of the light emitting elements.

Referring to FIGS. 8A, 8B, and 8C, first data R_DATA corresponding to a first luminance difference, second data G_DATA corresponding to a second luminance difference, and third data B_DATA corresponding to a third luminance difference may be calculated. The first data R_DATA, the second data G_DATA, and the third data B_DATA may correspond to those of the red (first color R), green (second color G), and blue (third color B) colors, respectively.

In the graphs of FIGS. 8A, 8B, and 8C, the horizontal axis may represent time (e.g., aging time AP), and the vertical axis may represent a luminance ratio (L/LO). LO may be the initial luminance, and L may be the luminance measured at the time of measurement.

In addition, as described above, the first data R_DATA, the second data G_DATA, and the third data B_DATA according to the related art may be a value changed by a value obtained by subtracting the luminance ratio of the white area from the luminance ratio of the black area at the corresponding time point. As illustrated in FIGS. 8A, 8B, and 8C, in the conventional RGB monochromatic lifespan evaluation method using black luminance and white luminance, there exists a drop period DROP in which the values of the first data R_DATA, the second data G_DATA, and the third data B_DATA sharply drop due to a sudden decrease in the luminance of the initial white area. The drop period DROP is a value that acts as noise in the initial period of life modeling and is desirable to be excluded.

Due to the drop period DROP, it may take a long time for the first data R_DATA, the second data G_DATA, and the third data B_DATA to have a normal form.

As illustrated in FIG. 8A, according to the related art, in a predetermined period after the drop period DROP, the luminance deviation due to the initial stress deviation of the thin film transistor according to whether the light emitting elements emit light is reflected in the first data R_DATA and is a factor hindering accurate lifespan calculation of the first light emitting element itself. Such data are garbage data. According to the related art, a first red garbage time GT1_A that cannot be used for modeling and/or evaluation of the first data R_DATA is about 50 hours.

In contrast, the first data R_DATA according to the present invention may be extracted through aging and red luminance measurement for the first pattern area PA1 and the second pattern area PA2. That is, during the aging period AP, the first pattern area PA1 is driven only in red (i.e., only the first light emitting elements that emit the first color R are driven), the second pattern area PA2 is driven only by light emitting pixels other than red (i.e., only the second light emitting elements that emit the second color G and the third light emitting elements that emit the third color B are driven so that, for example, cyan color is shown in the second pattern area PA2), and then the luminance deviation may be calculated by displaying red in the first and second pattern areas PA1 and PA2. Since not only the first pattern area PA1, which is the area to be calculated for the red lifespan, but also the second pattern area PA2, which is the reference area (or comparison area), is aged to a color other than red, the luminance change due to the initial stress deviation of the thin film transistors may be minimized. In addition, the amount of current initially supplied to the OLED panel 200 may decrease due to red aging rather than full-white aging in the first pattern area PA1, thereby reducing the influence of the thin film transistor.

Therefore, as illustrated in FIG. 8A, in the first data R_DATA according to the embodiments of the present invention, the initial drop period DROP is removed, and a second red garbage time GT1_B that cannot be used for modeling and/or evaluation of the first data R_DATA may be greatly reduced to 4 hours or less.

As illustrated in FIG. 8B, according to the related art, a first green garbage time GT2_A including the drop period DROP when the second data G_DATA is calculated may be about 40 hours or more.

In contrast, the second data G_DATA according to the present invention may be extracted by aging and green luminance measurement for the third pattern area PA3 and the fourth pattern area PA4. Since the third pattern area PA3, which is the area to be calculated for the green lifespan, is aged to emit green light (i.e., only the second light emitting elements that emit the green light are driven), and the fourth pattern area PA4, which is the reference area (or comparison area), is also aged to a color other than green (e.g., magenta, that is, only the first light emitting elements that emit the first color R and the third light emitting elements that emit the third color B are driven), the luminance change due to the initial stress deviation of the thin film transistors may be minimized.

Therefore, as illustrated in FIG. 8B, the initial drop period DROP of the second data G_DATA according to embodiments of the present invention may be minimized, and the second green garbage time GT2_B may also be greatly shortened to 3 hours or less. As illustrated in FIG. 8C, according to the related art, the first blue garbage time GT3_A including the drop period DROP when the third data B_DATA is calculated may be about 30 hours or more.

However, the third data B_DATA according to the present invention may be extracted by aging and blue luminance measurement for the fifth pattern area PA5 and the sixth pattern area PA6. Since the fifth pattern area PA5, which is the area to be calculated for the blue lifespan, is aged to emit blue light (i.e., only the second light emitting elements that emit the green light are driven in the fifth pattern area PA5), and the sixth pattern area PA6, which is the reference area (or comparison area), is also aged to a color other than blue (e.g., yellow, that is, only the first light emitting elements that emit the first color R and the third light emitting elements that emit the third color B are driven), the luminance change due to the initial stress deviation of the thin film transistors may be minimized.

Therefore, as illustrated in FIG. 8C, in the third data B_DATA according to embodiments of the present invention, the initial drop period DROP may be minimized or removed, and the second blue garbage time GT3_B may also be greatly reduced to 5 hours or less.

As described above, the method for evaluating the lifespan of the OLED panel according to embodiments of the present invention may measure the lifespan after aging the target pattern areas (e.g., the first, third, and fifth pattern areas PA1, PA3, and PA5) to red, green, and blue, respectively, and aging the reference pattern areas (e.g., the second, fourth, and sixth pattern areas PA2, PA4, and PA6) to colors that do not drive red, green, and blue, respectively. Therefore, since the influence of the thin film transistors on the lifespan evaluation of light emitting elements is minimized, the drop period DROP at the early stage of aging and lifespan modeling/evaluation may be eliminated or minimized and garbage time may also be greatly reduced. Therefore, the monochromatic lifespan evaluation and lifespan modeling time may be shortened, and the evaluated lifespan reliability may be effectively improved.

Figure 10:
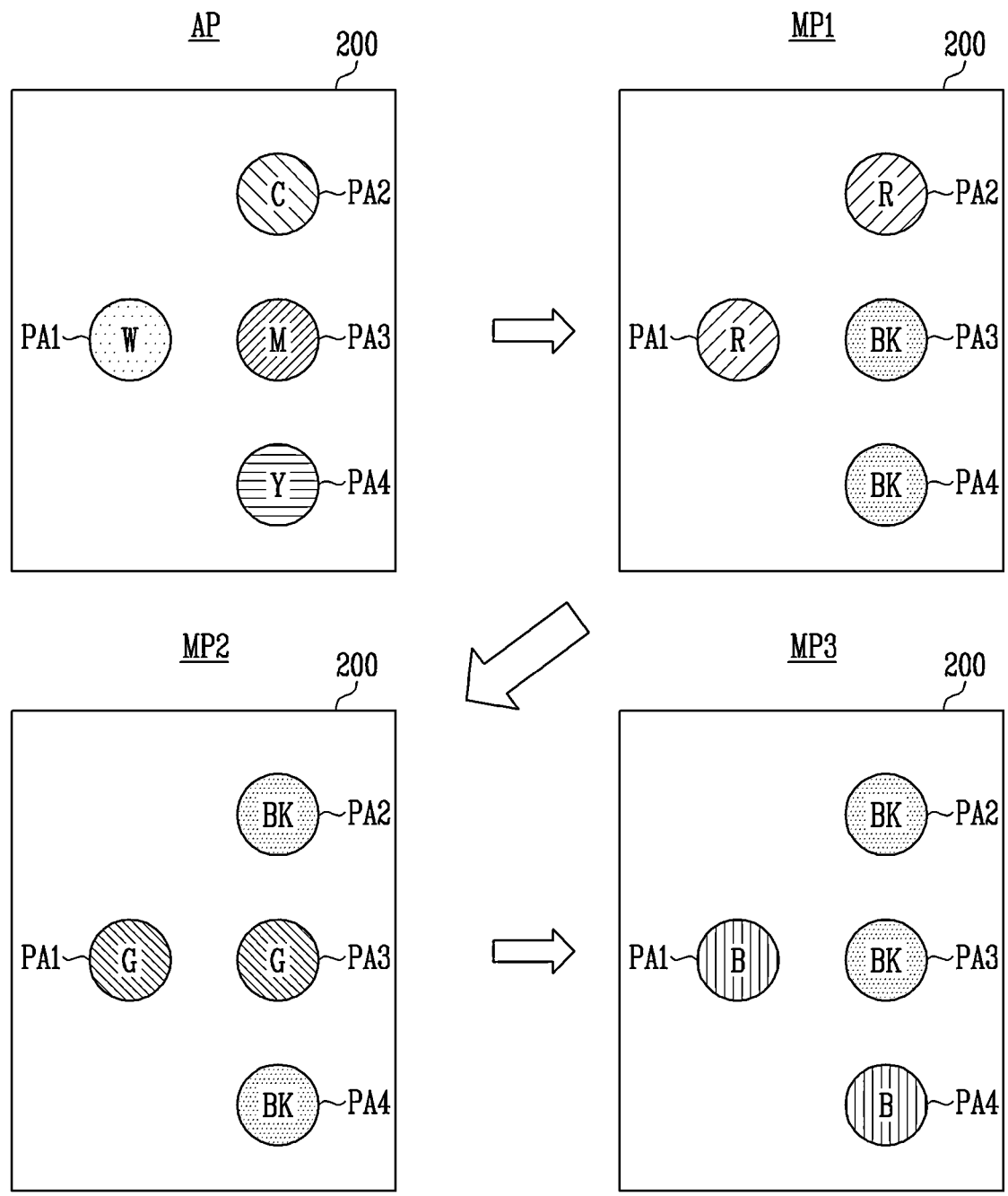
FIG. 10 is a diagram illustrating an example of image patterns displayed in pattern areas during an aging period and measurement periods by the method for evaluating the lifespan of the OLED panel in FIG. 9.

FIG. 9 is a flowchart illustrating a method for evaluating a lifespan of an OLED panel according to embodiments of the present invention, and FIG. 10 is a diagram illustrating an example of image patterns displayed in pattern areas during an aging period and measurement periods by the method for evaluating the lifespan of the OLED panel in FIG. 9.

The embodiment of FIGS. 9 and 10 differs from the embodiment of FIG. 1 in terms of a driving to temporally separate RGB monochromatic lifespan by using one lifespan calculation target area (FIG. 9) and a driving to spatially separate RGB monochromatic lifespan by using three RGB areas (FIG. 1).

Referring to FIGS. 9 and 10, in the method for evaluating the lifespan of the OLED panel, aging may be performed by displaying, during the aging period AP, white W (e.g., full-white) in the first pattern area PA1, displaying the fourth color C (e.g., cyan) in the second pattern area PA2, displaying the fifth color M (e.g., magenta) in the third pattern area PA3, and displaying the sixth color Y (e.g., yellow) in the fourth pattern area PA4 (S10).

For example, in the aging period AP, aging may be performed by light emission of the four pattern areas PA1 to PA4. In the first pattern area PA1, all the first to third light emitting pixels may emit light to display a full-white color. In the second pattern area PA2, only the second and third light emitting pixels may emit light. In the third pattern area PA3, only the first and third light emitting pixels may emit light. In the fourth pattern area PA4, only the first and second light emitting pixels may emit light. Therefore, lifespan evaluation noise caused by deviation in the stress of the thin film transistor during aging may be effectively minimized or eliminated.

In an embodiment, portions other than the first to fourth pattern areas PA1 to PA4 may display black. In addition, in an embodiment, each of the first to fourth pattern areas PA1 to PA4 may be about 5-20% of the total area of the OLED panel.

In a first measurement period MP1, the luminances in the first pattern area PA1 and the second pattern area PA2 may be measured by displaying the first color R in the first pattern area PA1 and the second pattern area PA2 (S20), and the lifespan of the first light emitting elements may be calculated based on the luminance difference between the first pattern area PA1 and the second pattern area PA2 (S30). For example, the luminance difference may be calculated from a subtraction value between a luminance ratio of the first pattern area PA1 and a luminance ratio of the second pattern area PA2. The luminance ratio may be defined as a ratio of a currently measured luminance to an initial luminance in the corresponding pattern area.

In an embodiment, in the first measurement period MP1, the third pattern area PA3 and the fourth pattern area PA4 may display black BK. For example, the third pattern area PA3 and the fourth pattern area PA4 do not emit light.

However, this is an example, and in the first measurement period MP1, the third pattern area PA3 and the fourth pattern area PA4 may display the fifth color M and the sixth color Y, respectively, in another embodiment.

In the second measurement period MP2, the luminances in the first pattern area PA1 and the third pattern area PA3 may be measured by displaying the second color G in the first pattern area PA1 and the third pattern area PA3 (S40), and the lifespan of the second light emitting elements may be calculated based on the luminance difference between the first pattern area PA1 and the third pattern area PA3 (S50). In an embodiment, in the second measurement period MP2, the second pattern area PA2 and the fourth pattern area PA4 may display black BK. For example, the second pattern area PA2 and the fourth pattern area PA4 do not emit light. However, this is an example, and in the second measurement period MP2, the second pattern area PA2 and the fourth pattern area PA4 may display the fourth color C and the sixth color Y, respectively, in another embodiment.

In the third measurement period MP3, the luminances in the first pattern area PA1 and the fourth pattern area PA4 may be measured by displaying the third color B in the first pattern area PA1 and the fourth pattern area PA4 (S60), and the lifespan of the third light emitting elements may be calculated based on the luminance difference between the first pattern area PA1 and the fourth pattern area PA4 (S70). In an embodiment, in the third measurement period MP3, the second pattern area PA2 and the third pattern area PA3 may display black BK. For example, the second pattern area PA2 and the third pattern area PA3 do not emit light. However, this is an example, and in the third measurement period MP3, the second pattern area PA2 and the third pattern area PA3 may display the fourth color C and the fifth color M, respectively, in another embodiment. Even though FIG. 9 shows an embodiment that the steps S10 to S70 are performed sequentially, the invention is not limited thereto. In another embodiment, step S40 or S60 may be performed before step S20, or step S60 may be performed before step S40.

On the other hand, since the method for calculating the lifespan of the light emitting elements by measuring the luminance of the pattern areas PA1 to PA4 has been described in detail with reference to FIGS. 5 to 8C, redundant descriptions thereof will be omitted.

As described above, in the method for evaluating the lifespan of the organic light emitting display device according to embodiments of the present invention, the RGB monochromatic lifespan may be evaluated in a time division manner through comparison of luminance with the second to third pattern areas PA2, PA3, and PA4 aged to cyan, magenta, and yellow with respect to the first pattern area PA1 aged to white W. Therefore, compared with the embodiments of FIGS. 1 to 7, the pattern area used for aging may be reduced.

Figure 11:
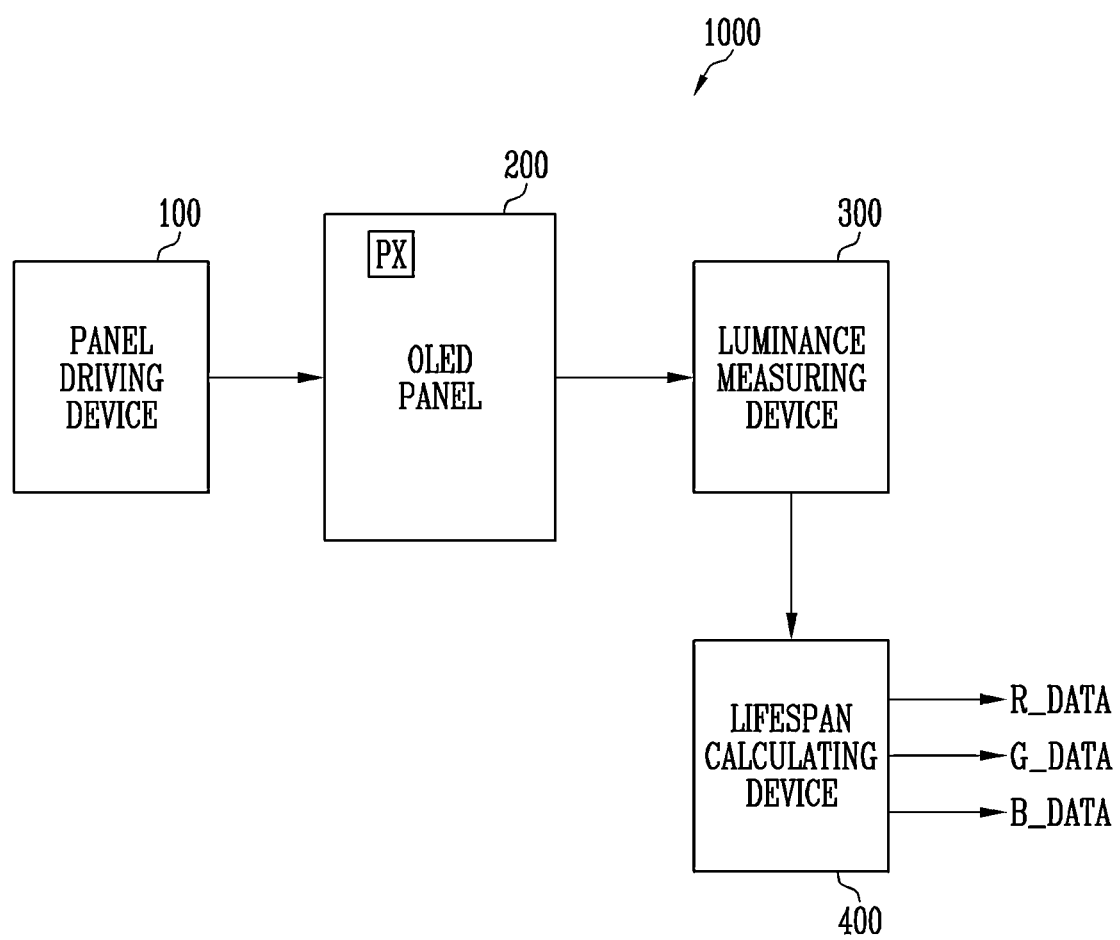
FIG. 11 is a block diagram illustrating a system for evaluating a lifespan of an OLED panel according to embodiments of the present invention.

FIG. 11 is a block diagram illustrating a system for evaluating a lifespan of an OLED panel according to embodiments of the present invention.

Referring to FIG. 11, the system 1000 for evaluating the lifespan of the OLED panel may include an OLED panel 200, a panel driving device 100, a luminance measuring device 300, and a lifespan calculating device 400.

In an embodiment, the system 1000 may further include a receiving unit (not shown) on which the OLED panel 200 is seated and to which the panel driving device 100 is connected.

The OLED panel 200 includes pixels PX. Each of the pixels PX may include one of a first light emitting element for emitting a first color, a second light emitting element for emitting a second color, and a third light emitting element for emitting a third color. Since the structure of the OLED panel 200 has been described in detail with reference to FIG. 2, redundant descriptions thereof will be omitted.

The panel driving device 100 may control light emission of the OLED panel 200 in each of an aging period and a measurement period. For example, the panel driving device 100 may determine pattern areas (i.e., PA1 to PA6) of the OLED panel and light emitting elements for emitting light from the pattern areas.

In an embodiment, the panel driving device 100 may supply various power supply voltages, scan signals, and data signals for driving to the OLED panel 200. The panel driving device 100 may include a hardware configuration and/or a software configuration for driving the OLED panel 200.

In an embodiment, the panel driving device 100 may drive the OLED panel 200 so that the first light emitting elements emit light in a first pattern area of the organic light emitting display panel during the aging period, and the second and third light emitting elements emit light in a second pattern area. In addition, the panel driving device 100 may perform control so that, during the aging period, the second light emitting elements emit light in the third pattern area, the first and third light emitting elements emit light in the fourth pattern area, the third light emitting elements emit light in the fifth pattern area, and the first and second light emitting elements emit light in the sixth pattern area. The panel driving device 100 may perform control so that, during the measurement period, the first light emitting elements emit light in the first and second pattern areas, the second light emitting elements emit light in the third and fourth pattern areas, and the third light emitting elements emit light in the fifth and sixth pattern areas.

However, this is an example, and the panel driving device 100 may drive the OLED panel 200 by driving as illustrated in FIGS. 9 and 10 in another embodiment.

The luminance measuring device 300 may measure the luminance of each of the first to sixth pattern areas during the measurement period. The luminance values measured by the luminance measuring device 300 may be provided to the lifespan calculating device 400.

The luminance measuring device 300 may perform measurements by using an optical apparatus for measuring luminance and/or color coordinates. For example, the luminance measuring device 300 may include at least one of a luminance color limiter and a spectrophotometer. Alternatively, the luminance measuring device 300 may sense a current/voltage from an optical apparatus including a photodiode (e.g., a CCD camera) and output a luminance value. However, this is an example, and the luminance measuring device 300 according to the invention is not limited thereto.

The lifespan calculating device 400 may calculate the lifespan of the first light emitting elements based on the luminance difference between the first pattern area and the second pattern area. In addition, the lifespan calculating device 400 may calculate the lifespan of the second light emitting elements based on the luminance difference between the third pattern area and the fourth pattern area, and may calculate the lifespan of the third light emitting elements based on the luminance difference between the fifth pattern area and the sixth pattern area.

In an embodiment, the lifespan calculating device 400 may output first to third data R_DATA, G_DATA, and B_DATA related to lifespan of the first to third light emitting elements. The lifespan calculating device 400 may include a software/hardware calculating unit for calculating a luminance value. In addition, the lifespan calculating device 400 may further include a lookup table in which luminance values or lifespan values (or lifespan classes) corresponding to the luminance differences are stored.

The lifespan calculating device 400 may calculate the first to third data R_DATA, G_DATA, and B_DATA as in the graphs of FIGS. 8A to 8C through the calculation on the luminance provided from the luminance measuring device 300.

Since the description related to the operation of the system for evaluating the lifespan of the OLED panel has been described in detail with reference to FIGS. 1 to 8. However, the operation of the system for evaluating the lifespan of the OLED panel according to the invention is not limited thereto. In another embodiment, the system for evaluating the lifespan of the OLED panel may operate the performances described in FIGS. 9 and 10 with corresponding manners. Therefore, redundant descriptions thereof will be omitted.

As described above, the method and the system for evaluating the lifespan of the OLED panel according to embodiments of the present invention may evaluate the lifespan after aging the pattern areas serving as criteria for evaluation of the red, green, and blue lifespan to colors that do not drive red, green, and blue. Thus, since the influence of the thin film transistors on the lifespan evaluation of light emitting elements is minimized, the drop period at the early stage of aging and lifespan modeling/evaluation may be eliminated or minimized and garbage time may also be greatly reduced. Therefore, the monochromatic lifespan evaluation and lifespan modeling time may be shortened, and the evaluated lifespan reliability may be effectively improved.

However, the effects of the present invention are not limited to the above-described effects, and may be variously expanded without departing from the spirit and scope of the present invention.

Although the present invention has been described with reference to the embodiments, it will be understood by those skilled in the art that various modifications and changes can be made thereto without departing from the spirit and scope of the present invention as set forth in the appended claims.

What is claimed is:

1. A method for evaluating a lifespan of an organic light emitting display panel, the method comprising:
    aging an organic light emitting display panel, including first light emitting elements for emitting a first color, second light emitting elements for emitting a second color, and third light emitting elements for emitting a third color, during a preset aging period by displaying the first color in a first pattern area of the organic light emitting display panel and displaying a fourth color in a second pattern area of the organic light emitting display panel;

measuring luminances of the first pattern area and the second pattern area by displaying the first color in the first pattern area and the first color in the second pattern area during a measurement period, while displaying the fourth color, which is different from the first color, in the second pattern area during the preset aging period; and calculating a lifespan of the first light emitting elements based on the measured luminance of the first pattern area and the measured luminance of the second pattern area.

2. The method of claim 1, wherein the second light emitting elements and the third light emitting elements emit light so as to display the fourth color in the second pattern area during the aging period.

3. The method of claim 2, wherein the fourth color is a complementary color of the first color in an RGB additive color mixing model.

4. The method of claim 2, further comprising:
during the aging period, displaying the second color in a third pattern area of the organic light emitting display panel, displaying a fifth color in a fourth pattern area of the organic light emitting display panel, displaying the third color in a fifth pattern area of the organic light emitting display panel, and displaying a sixth color in a sixth pattern area of the organic light emitting display panel.

5. The method of claim 4, wherein the first light emitting elements and the third light emitting elements emit light in the fourth pattern area, and
the first light emitting elements and the second light emitting elements emit light in the sixth pattern area during the aging period.

6. The method of claim 5, wherein the first to sixth pattern areas simultaneously emit light.

7. The method of claim 5, wherein the fifth color is a complementary color of the second color in an RGB additive color mixing model, and the sixth color is a complementary color of the third color in the RGB additive color mixing model.

8. The method of claim 5, wherein the first, second, and third colors are red, green, and blue, respectively, and
the fourth, fifth, and sixth colors are cyan, magenta, and yellow, respectively.

9. A system for evaluating a lifespan of an organic light emitting display panel, the system comprising:
an organic light emitting display panel including first light emitting elements for emitting a first color, second light emitting elements for emitting a second color, and third light emitting elements for emitting a third color;
a panel driving device which controls light emission of the organic light emitting display panel during an aging period and a measurement period;
a luminance measuring device which measures luminances of first and second pattern areas of the organic light emitting display panel during the measurement period; and
a lifespan calculating device which calculates a lifespan of the first light emitting elements based on a difference between the measured luminance of the first pattern area and the measured luminance of the second pattern area,
wherein, in the aging period, only the first light emitting elements among the first to third emitting elements in the first pattern area emit light, and only the second and third light emitting elements among the first to third emitting elements in the second pattern area emit light, and
in the measurement period, the first light emitting elements emit light in the first pattern area and the second pattern area.

10. The system of claim 9, wherein, during the aging period, the second light emitting elements emit light in a third pattern area of the organic light emitting display panel, the first and third light emitting elements emit light in a fourth pattern area of the organic light emitting display panel, the third light emitting elements emit light in a fifth pattern area of the organic light emitting display panel, and the first and second light emitting elements emit light in a sixth pattern area of the organic light emitting display panel,
in the measurement period, the second light emitting elements emit light in the third and fourth pattern areas, and the third light emitting elements emit light in the fifth and sixth pattern areas, and
the luminance measuring device measures luminances of the third to sixth pattern areas during the measurement period.

* * * * *